US006099215A

United States Patent [19]

Piggott

[11] Patent Number: 6,099,215

[45] Date of Patent: *Aug. 8, 2000

[54] CLAMPING DEVICE

[75] Inventor: David C. Piggott, Lakefield, Canada

[73] Assignee: Quickmill Inc., Ontario, Canada

[ * ] Notice: This patent is subject to a terminal disclaimer.

[21] Appl. No.: 09/024,550

[22] Filed: Feb. 17, 1998

Related U.S. Application Data

[63] Continuation-in-part of application No. 08/252,849, Jun. 2, 1994, Pat. No. 5,743,685.

[51] Int. Cl.[7] .................... B23Q 3/00

[52] U.S. Cl. .................... 409/131; 269/21; 279/3; 408/76; 409/225

[58] Field of Search .................... 279/3; 269/21; 409/131, 225; 408/76, 1 R

[56] References Cited

U.S. PATENT DOCUMENTS

| | | | |
|---|---|---|---|
| 2,443,987 | 6/1948 | Morrison et al. | 279/3 |
| 2,730,370 | 1/1956 | Brewster | 269/21 |
| 2,946,246 | 7/1960 | Allan . | |
| 2,955,829 | 10/1960 | Brewster | 279/3 |
| 3,253,665 | 5/1966 | Schienle . | |
| 4,357,006 | 11/1982 | Hayes . | |
| 4,582,460 | 4/1986 | Silverberg et al. . | |
| 4,669,226 | 6/1987 | Mandler . | |
| 4,723,766 | 2/1988 | Beeding . | |
| 4,795,518 | 1/1989 | Meinel et al. . | |
| 5,110,239 | 5/1992 | Riley . | |
| 5,133,824 | 7/1992 | Huberts et al. . | |
| 5,141,212 | 8/1992 | Beeding . | |
| 5,177,857 | 1/1993 | Ito . | |
| 5,222,719 | 6/1993 | Effner . | |
| 5,226,636 | 7/1993 | Nenadic et al. . | |
| 5,249,343 | 10/1993 | Grosso et al. . | |
| 5,264,069 | 11/1993 | Dietrich et al. . | |
| 5,281,297 | 1/1994 | Lee . | |
| 5,743,685 | 4/1998 | Piggott | 279/3 |

*Primary Examiner*—Daniel W. Howell
*Attorney, Agent, or Firm*—Thomas A. O'Rourke; Wyatt Gerber & O'Rourke

[57] ABSTRACT

A device for establishing a seal between a pair of articles, has a first resilient member arranged to be positioned between the articles, so that the first resilient member and the articles collectively form a first chamber. A vacuum supply is provided for supplying a vacuum to the first chamber. A pressure supply is also provided for applying a pressure to the first resilient member to force the first resilient member against both of the articles.

13 Claims, 7 Drawing Sheets

CLAMPING DEVICE

REFERENCE TO CO-PENDING APPLICATION

This is a continuation in part of application Ser. No. 08/252,849 filed Jun. 2, 1994, now U.S. Pat. No. 5,743,685, the subject matter of which is incorporated herein by reference.

BACKGROUND OF THE INVENTION

1. Field of the Invention

The present invention relates to a technique for sealing articles together, and more particularly to methods and devices for clamping articles together, such as a work piece to a work piece processing machines, using the technique.

2. Description of the Related Art

Workpiece processing machines such as milling machines are commonly found in modern metal machining facilities. One type of milling machine is a gantry type having a large workpiece receiving bed and a tool driver positioned above the bed with three axes of movement.

Commonly, the work piece is clamped to the bed by a number of clamps bolted into selected locations on the bed. In some cases, special fixtures are welded to the workpiece in order to use the clamps. Either technique can be a complicated and time consuming process. Yet, these clamping techniques remain as standards in industry.

It is an object of the present invention to provide obviate or mitigate these difficulties.

SUMMARY OF THE INVENTION

Briefly stated, the invention involves a device for establishing a seal between a pair of articles, comprising a first resilient member arranged to be positioned between the articles, so that the first resilient member and the articles collectively form a first chamber;

vacuum supply means for supplying a vacuum to the first chamber; and pressure supply means for applying a pressure to the first resilient member to force the first resilient member against both of the articles.

In one embodiment, the articles have complementary mating surfaces, the first resilient member being located therebetween. One of the articles includes a recess formed in the corresponding mating surface, the recess having an inner surface portion. The first resilient member is positioned in the recess and having an exposed surface which is exposed to the inner surface portion, the first resilient member being movable in the recess to cause the exposed surface to be spaced from the inner surface portion to form a second chamber therebetween. Thus, the first resilient member is movable under the action of the pressure to establish a seal between the articles, while maintaining a seal between the first resilient member and the recess.

In another aspect of the present invention, there is provided a method for establishing a seal between a pair of articles, comprising the steps of:

locating a first resilient member between the articles, so that the first resilient member and the articles collectively form a first chamber;

applying a vacuum in the first chamber; and applying a positive pressure to the first resilient member to force the first resilient member against the articles.

Preferably, a pair of complementary mating surfaces are formed on the articles and the first resilient member is located between the mating surfaces. A recess is formed on one of the mating surfaces and the first resilient member is positioned therein, so that the first resilient member has an exposed surface which is exposed to the inner surface portion and the first resilient member is movable in the recess to cause the exposed surface to be spaced from the inner surface portion to form a second chamber therebetween.

Preferably, the first resilient member is movable under the action of the pressure to establish a seal between the workpiece and the first resilient member, while maintaining a seal between the first resilient member and the recess.

In another aspect, the invention involves a device for clamping a workpiece to a workpiece processing machine, the device comprising;

a workpiece-engaging portion including a workpiece-engaging surface;

sealing means for sealing the workpiece-engaging portion with the workpiece; the sealing means including a first resilient member arranged to seal between the workpiece-engaging surface and the workpiece, wherein the sealing means, the workpiece-engaging portion and the workpiece collectively form a first chamber;

vacuum supply means for supplying a vacuum to the first chamber to draw together the workpiece and the workpiece-engaging portion; and pressure supply means for applying a pressure to the first resilient member to force the first resilient member against the workpiece-engaging portion and the workpiece.

In another aspect of the present invention, there is provided a method for clamping a workpiece to a workpiece processing machine, comprising the steps of:

providing a workpiece-engaging portion including a workpiece-engaging surface;

locating a workpiece on the workpiece-engaging surface;

sealing the workpiece-engaging portion with the workpiece, the step of sealing further including the step of providing a first resilient member to seal between the workpiece-engaging surface and the workpiece so that the workpiece-engaging portion and the workpiece collectively form a first chamber;

providing a supply of vacuum to the first chamber to draw together the workpiece and the workpiece-engaging portion; and providing a supply of pressure to the first resilient member to force the first resilient member against the workpiece-engaging portion and the workpiece.

In still another aspect of the present invention, there is provided a workpiece processing machine comprising;

a bed;

means for clamping a workpiece to the bed, including at least one workpiece-engaging portion having a workpiece-engaging surface;

sealing means for sealing the workpiece-engaging portion with the workpiece, the sealing means including a first resilient member arranged to seal between the workpiece-engaging surface and the workpiece, wherein the workpiece, the sealing means and the workpiece-engaging portion collectively form a first chamber;

vacuum supply means for supplying a vacuum to the first chamber to draw together the workpiece and the workpiece-engaging portion; and pressure supply means for applying a pressure to the first resilient member to force the first resilient member against the workpiece and the workpiece-engaging portion.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Referring to the figures, there is provided a workpiece processing machine in the form of a gantry type milling machine 10 having a workpiece-receiving bed 12 and a tool driver 14 located above the bed and operable with three axes of movement.

Figure 1:
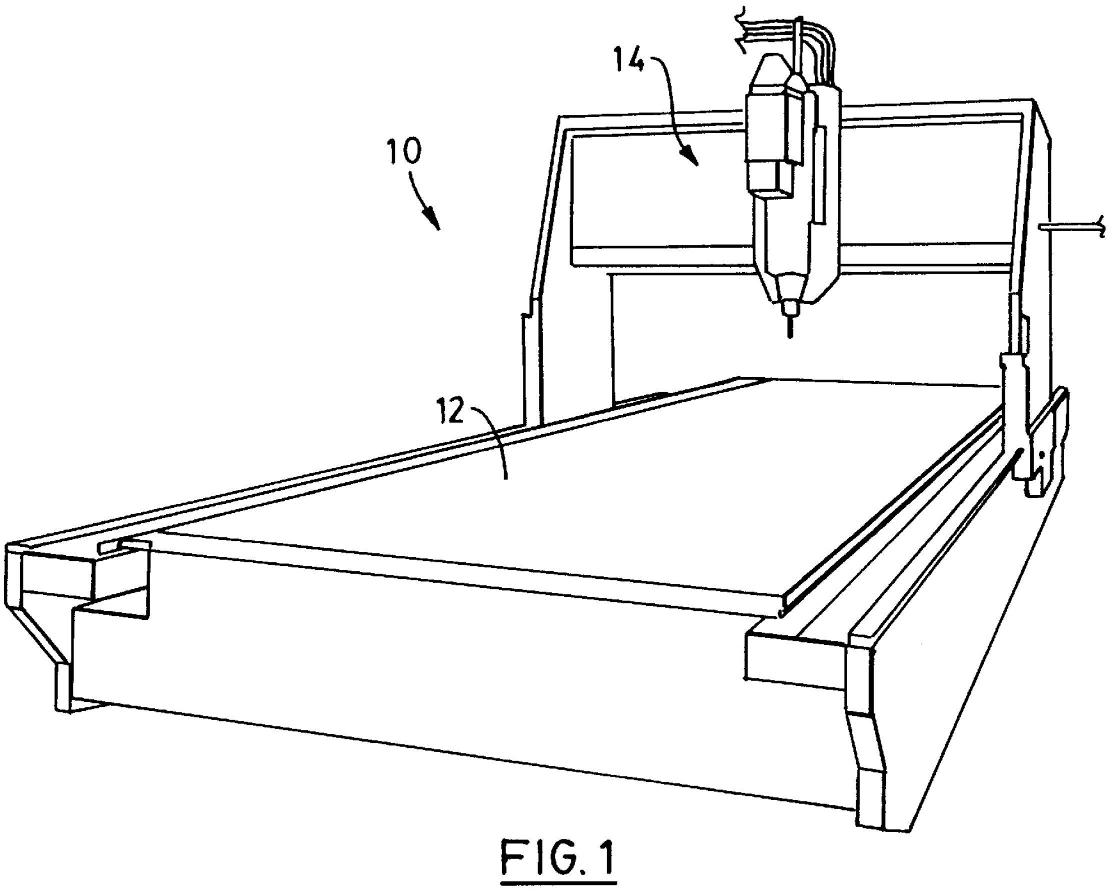
FIG. 1 is a perspective view of a gantry type milling machine.
Figure 2:
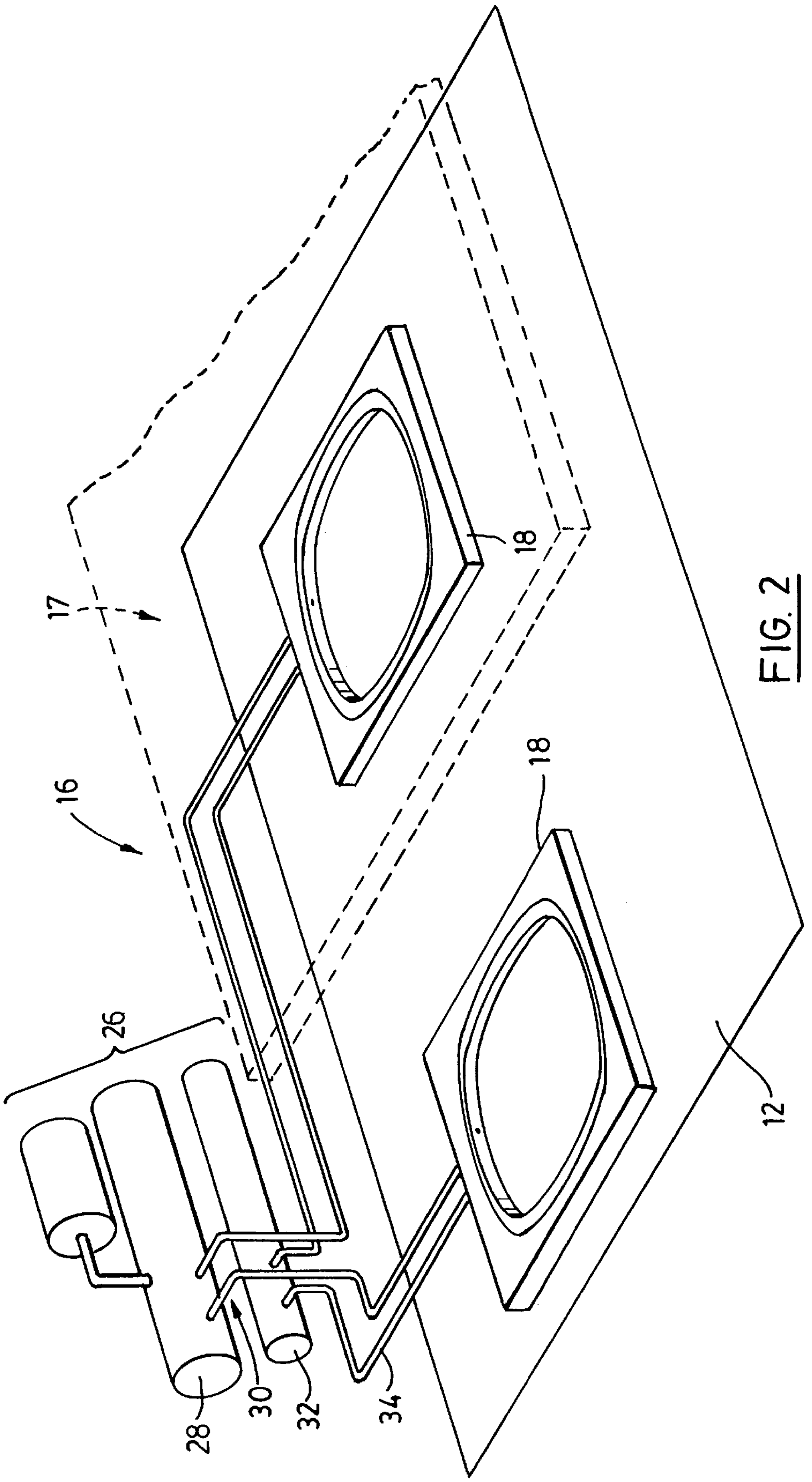
FIG. 2 is a perspective view of a clamping device for the milling machine of FIG. 1.
Figure 3:
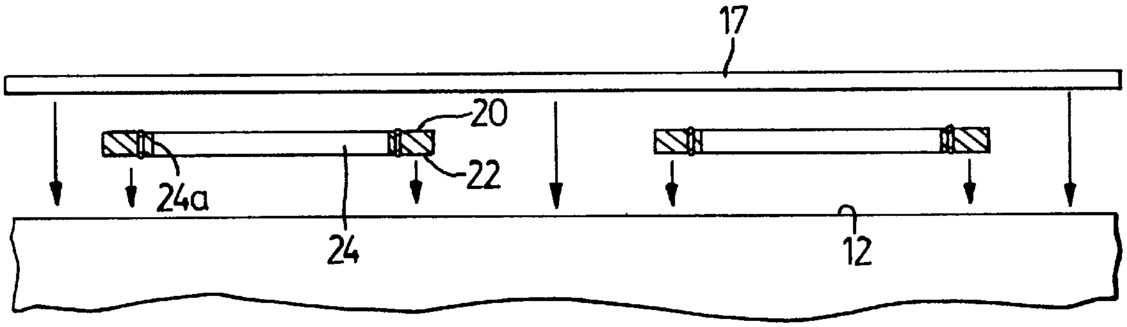
FIG. 3 is a side view of a portion of the device illustrated in FIG. 2.

Referring to FIG. 2, there is provided a device 16 for clamping a workpiece shown at 17 to the bed 12 of the milling machine 10. As will be described, the device 16 includes a pair of sandwich members 18. As shown in FIG. 3, each sandwich member 18 has a pair of opposite surfaces including a workpiece-engaging surface 20 and a bed-engaging surface 22. An aperture 24 is formed in the sandwich member and extends between the workpiece-engaging and the bed-engaging surfaces 20 and 22 respectively. The aperture is further provided with a periphery shown at 24*a*.

A sealing means is provided for sealing the periphery 24*a* when the workpiece-engaging and the bed-engaging surfaces are engaged with the workpiece and bed respectively. In the embodiment shown in the figures, this sealing means is in the form of a first resilient member arranged to seal between the workpiece-engaging surface and the workpiece and a second resilient member arranged to seal between the bed-engaging surface and the bed. In this manner, the sealing means, the sandwich member, the bed and the workpiece form a first chamber.

Referring to FIG. 2, a supply means is also provided at 26 to supply both a vacuum and a pressure to the device 16. The supply means includes a vacuum supply 28 which is in fluid communication with each of the first chambers by way of a number of vacuum lines, one of which is shown at 30. As will be explained, the vacuum supply is arranged to draw the workpiece, the sandwich member and the bed together.

The supply means also includes a pressure supply 32 which is in fluid communication with each of the first and second resilient members by way of a number of pressure lines, one of which is shown at 34. As will be explained, the pressure supply means is arranged to apply a pressure to the first and second resilient members to force the first resilient member against the sandwich member and the workpiece and to force the second resilient member against the sandwich member and the bed.

Figure 6:
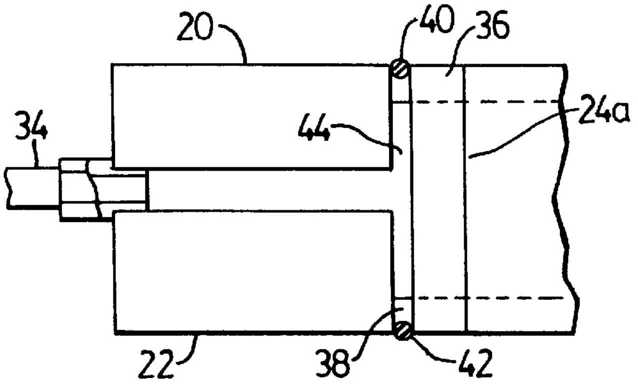
FIG. 6 is a sectional view taken, on line 6—6 of FIG. 5.
Figure 3A:
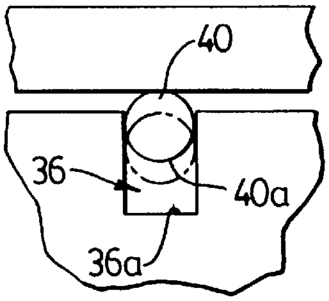
FIG. 3*a* is a sectional view of another portion of the device illustrated in FIG. 2 in an operative position.
Figure 7:
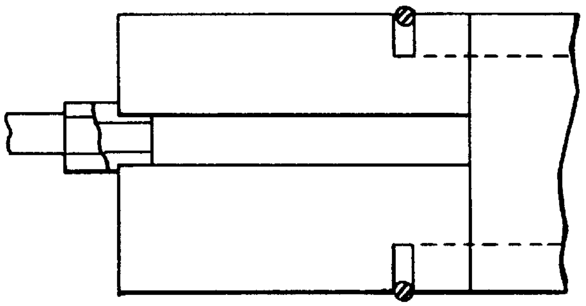
FIG. 7 is a sectional view taken on line 7—7 of FIG. 5.
Figure 4:
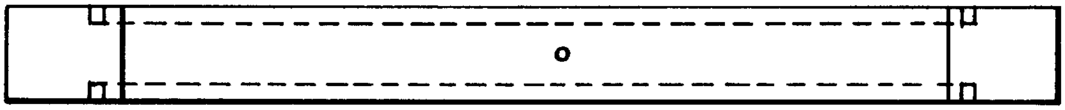
FIG. 4 is a side view of one element of the device illustrated in FIG. 2.
Figure 5:
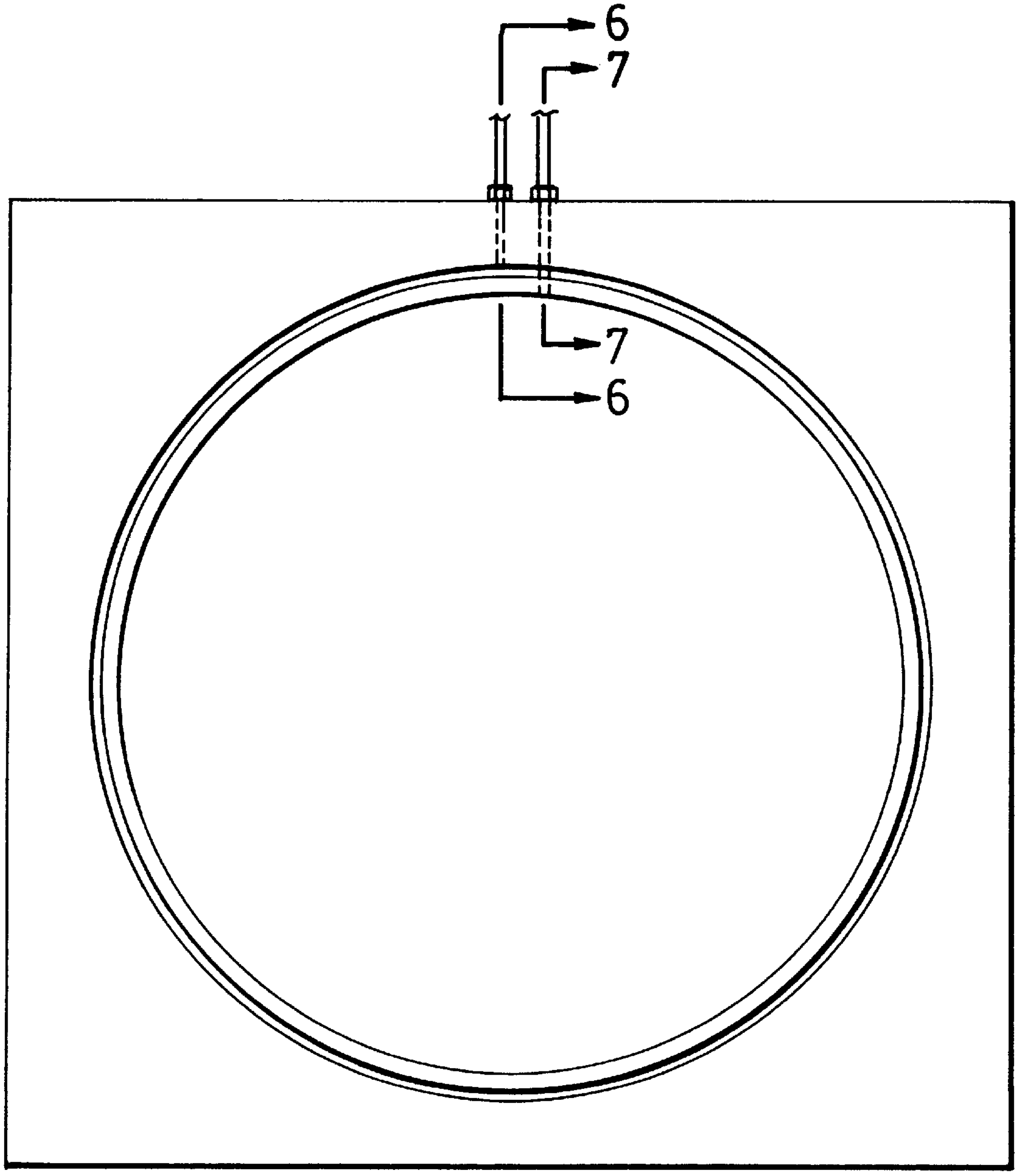
FIG. 5 is a plan view of the element illustrated in FIG. 4.

Referring more particularly to FIGS. 6 and 7, the sandwich member further includes a first recess 36 formed adjacent the periphery 24*a* in the workpiece-engaging surface 20 and a second recess 38 formed adjacent the periphery 24*a* in the bed-engaging surface 22. In this case, the first and second resilient members are in the form of o-rings 40 and 42 respectively and each is engaged with a respective recess 36 and 38. Furthermore, a passage 44 is formed between the recesses 36 and 38 to join with the pressure line 34 to form collectively a second chamber. More particularly, as shown in FIG. 3*a*, the second chamber is formed by a recess 36 having an inner surface portion 36*a* and an exposed outer surface 40*a* on the resilient member which is exposed to the inner surface portion 36*a*.

There should be a slight 'squeeze' between the o-ring and the recess allowing the second chamber to be sealed while permitting the o-ring to travel outwardly under the influence of the pressure to engage the workpiece or the bed as the case may be. For example, a prototype of the present embodiment makes use of a recess having a cross sectional width of 0.200 inches while each o-ring has a diameter of 0.207 inches, giving a squeeze tolerance of 3.4 percent. This is contrasted with conventional o-ring squeezing tolerances of up to 20 percent. In other words, the o-ring must be able to move freely in the recess while being capable of sealing against the walls thereof.

In use, the sandwich members are placed on the bed of the milling machine, with the vacuum and pressure lines joined with the first and second chambers respectively. The workpiece is then installed on the sandwich members. It will be understood that, while only two sandwich members are shown in the figures, any number of sandwich members may be provided depending on the dimensions of both the sandwich members and the workpiece. For example, three rows of two sandwich members each may provide sufficient support beneath the workpiece to prevent the workpiece from shifting during the milling operation.

Once the workpiece is installed, the vacuum and pressure supplies are activated drawing a vacuum inside the first chamber and establishing a pressure inside the second chamber. As the level of vacuum increases in the first chamber (which for example may be at a level of 10 pounds per square inch), the effective clamping force of the workpiece correspondingly increases according to the cross sectional area of the aperture multiplied by the pressure deferential between the first chamber and ambient pressure.

The pressure supply pressurizes the second chamber which causes the o-ring to be forced outwardly (for example at a pressure of 20 pounds per Square inch). Had the workpiece not been in place, the pressure supply would force the o-ring out of the recess. However, with the workpiece in place, the o-ring is instead pressed against the walls of the recess as well as the surface of workpiece to take on an elliptical cross section as shown in FIG. 3*a*. In this manner, the o-ring is forced to conform with irregularities on the surface of the workpiece, such as mill-scale, a spot of weld, dirt and the like. As a result, the o-ring is able to accommodate these irregularities and enhance the seal at the periphery of the aperture and thus the first chamber. In other words, the first resilient member is movable in the recess under the action of the pressure to establish a seal between the workpiece and the resilient member, while maintaining a seal between the resilient member and the recess.

Were it not for the pressure means, the first and second resilient members may not be able to accommodate these irregularities on the workpiece (and indeed those that may exist on the bed as well), thus limiting the vacuum if any that can be established in the first chamber and thus the clamping force of the workpiece.

Figure 8:
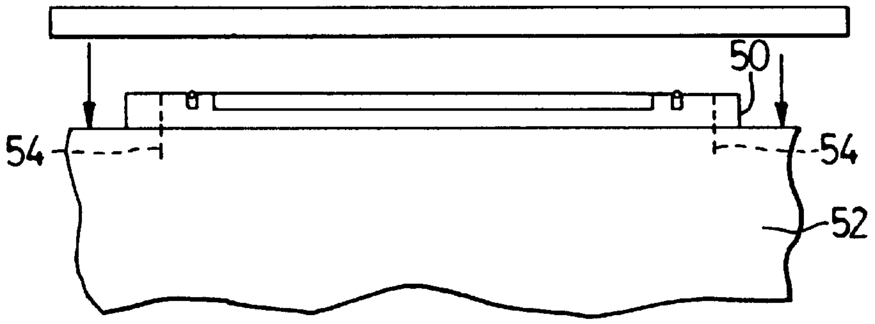
FIG. 8 is a side view of a portion of another milling machine.

If desired, the sandwich member may be equipped with just one operable sealing surface, such as the one to receive the workpiece. In this case, the other surface may lie against, but be otherwise attached to, the bed of the milling machine as shown for example in FIG. 8. In this case, the sandwich member 50 is fixed to the bed 52 by way of fasteners shown by the dashed lines at 54.

Figure 9:
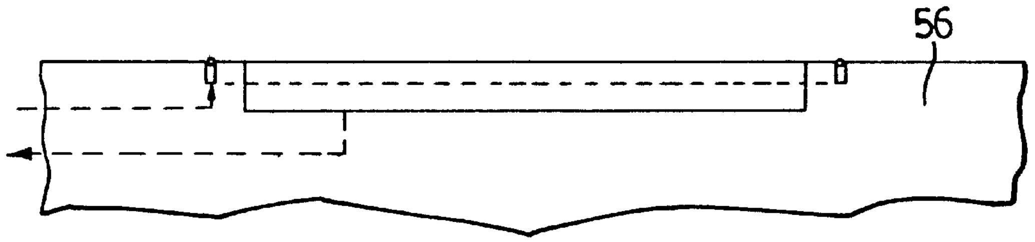
FIG. 9 is a side view of a portion of still another milling machine.

If desired, the workpiece-engaging portion may alternatively form an integral part of the bed of the milling machine itself as shown at 56 in FIG. 9.

Figure 10:
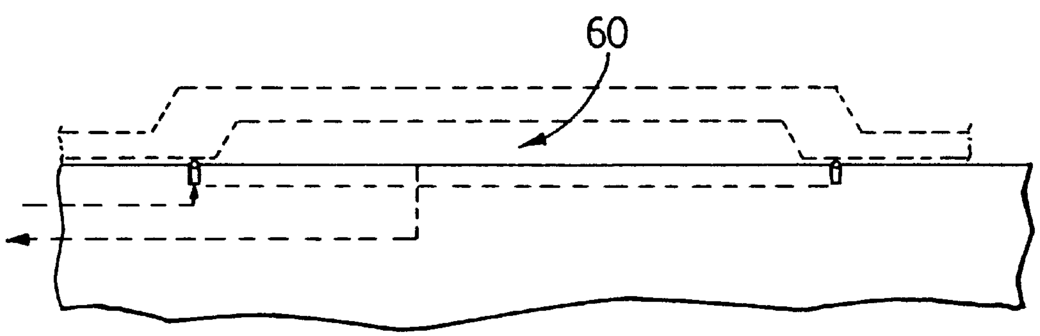
FIG. 10 is a side view of a portion of yet another milling machine.

While the above embodiments illustrate the use of an aperture and the o-ring located adjacent the aperture, the device may provide adequate clamping effect without the need of the aperture, apart from that needed to establish the vacuum in the first chamber. For example, FIG. 10 illustrates such a case where the first chamber 60 is formed in part by a concave surface on the workpiece shown in dashed lines.

Although the above embodiments discuss a clamping technique used with a milling machine, other types of workpiece processing equipment may equally benefit from the clamping technique disclosed, such as drilling, sawing and routing machines as well as others that make use of a workpiece receiving bed.

The above devices illustrate an exemplified device for establishing a seal between a pair of articles, comprising a first resilient member arranged to be positioned between the articles, so that the first resilient member and the articles collectively form a first chamber; vacuum supply means for supplying a vacuum to the first chamber; and pressure supply means for applying a positive pressure to the first resilient member to force the first resilient member against both of the articles. In the particular examples shown above, the devices are embodied in a work piece processing machine such as milling machine.

Figure 12:
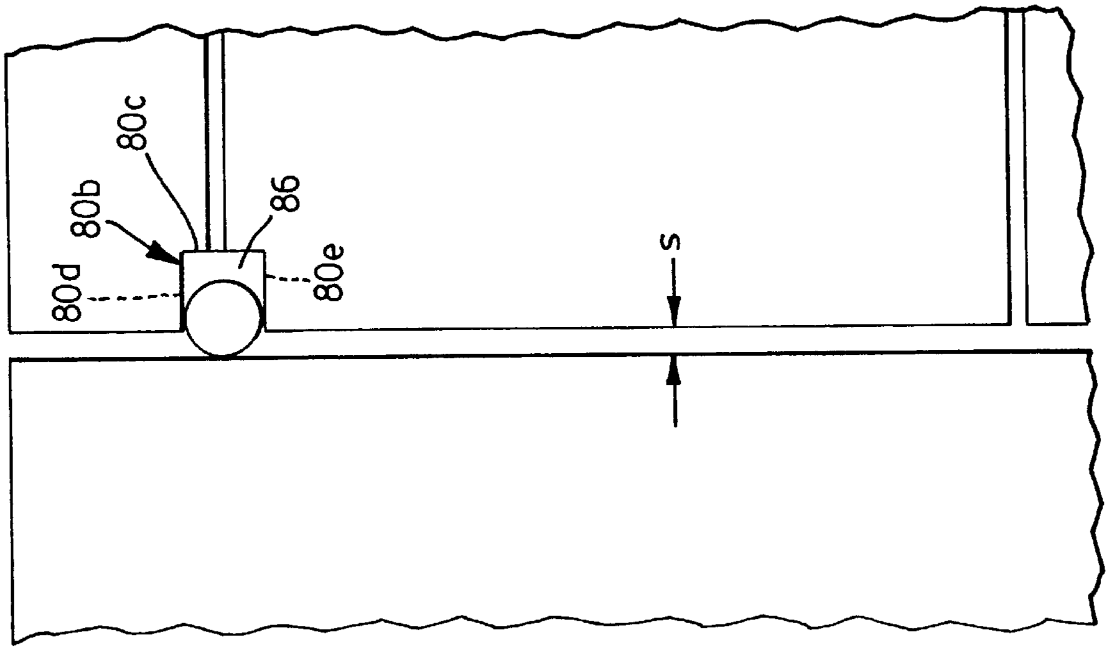
FIGS. 11, 12, 13, 14, and 15 are schematic views of a technique for establishing a seal between a number of articles.
Figure 11:
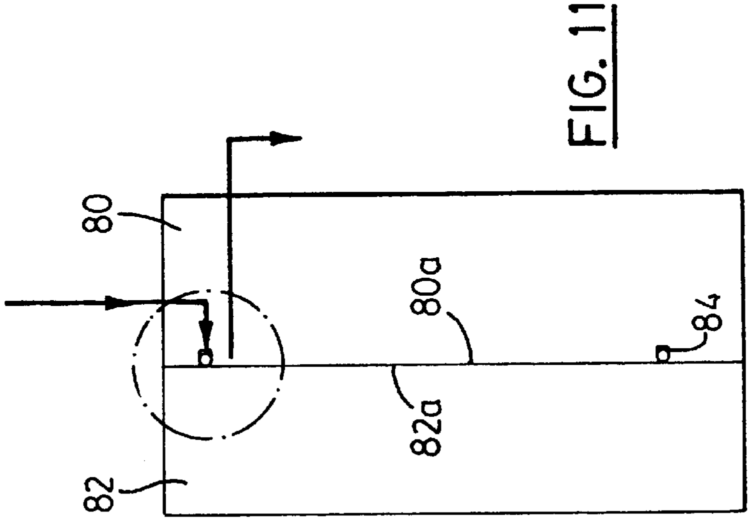

The technique embodied in these devices as well as the method discussed herein above, can be applied to other situations where it is desirable to establish a seal between a pair of articles. Referring to FIGS. 11 and 12, for example, there is shown a pair of articles 80, 82, having complementary mating surfaces 80*a*, 82*a* and the first resilient member 84 being located therebetween. In this case, the article 80 includes a recess 80*b* formed in the corresponding mating surface with an inner surface portion shown at 80*c* and a pair of opposed side faces 80*d*, 80*e*. The first resilient member is positioned in the recess with an exposed surface 84*a* which is exposed to the inner surface portion 80*c*. The first resilient member 84 is movable in the recess to cause the exposed surface to be spaced from the inner surface portion to form a second chamber therebetween as shown at 86. Thus, the first resilient member is movable under the action of the pressure to establish a seal between the articles, while maintaining a seal between the first resilient member and the recess.

The arrangement as shown in FIGS. 11 and 12 is useful in that the spacing ‘s’ between the mating surfaces which forms the first chamber can be relatively small, for example in the order of a few thousandths of an inch, if desired, it being understood that FIG. 12 shows the spacing ‘s’ considerably larger for illustration purposes. In addition, the surfaces may if desired, be formed with sufficient roughness that the surfaces with physically engage one another while not affecting the quality of the established seal. The seal can, by consequence, establish a significant negative normal force and a significant frictional force between the two articles, the greater the vacuum and the greater the roughness (and hence the coefficient of friction there between) the greater the frictional force. The negative normal force can thus be used as a force of attraction to, in effect, maintain the seal in a clamping fashion. The forces generated by the seal are directly proportional to the degree of vacuum and the surface area bounded by the first resilient member. Therefore, a vacuum of 5 pounds per square inch exerted on an area of, say, a circle with a one foot diameter, would generate a force of in excess of 500 pounds.

Figure 13:
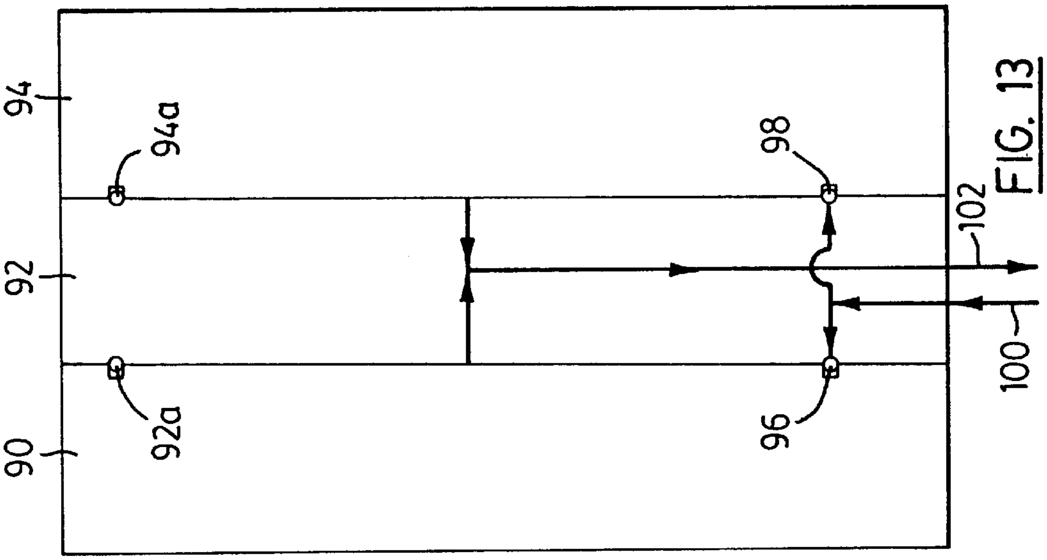

FIG. 13 is a schematic view of three articles 90, 92 and 94 sealed together by the use of, in effect, two sealing devices as discussed above, having two resilient members 96, 98 located in a corresponding recess 92*a*, 94*a*. The recesses are joined to a common pressure supply line shown at 100 and each forming a chamber fed by a common vacuum supply line shown at 102, thereby to establish a force to join the three articles together.

Figure 15:
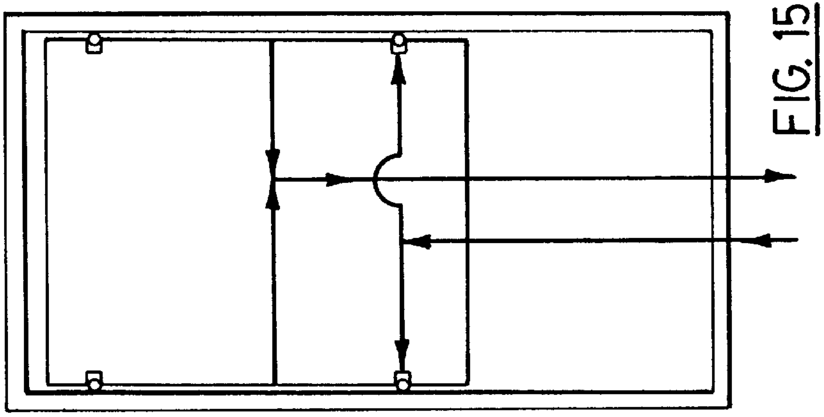
Figure 14:
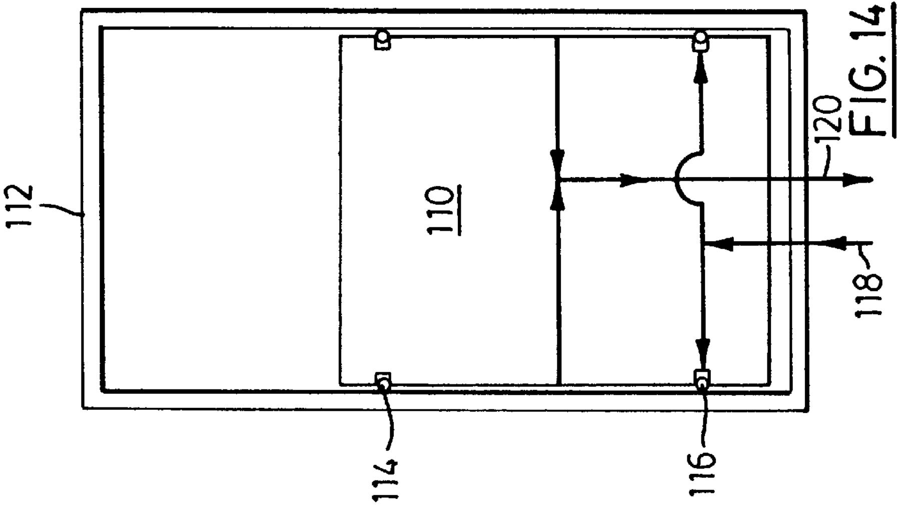

FIGS. 14 and 15 are schematic views showing two nested articles 110, 112, the inner of which is provided with two sealing devices as described above, including two resilient members 114, 116, with pressure and vacuum lines 118, 120 respectively. In this case, the force established between the two articles allows the inner article to be positioned relative to the outer article or vice versa, so that the position of the inner article can be held in a number of positions, such as a lower position in FIG. 14 and an upper position as shown in FIG. 15.

What is claimed is:

1. A device for establishing a seal between a pair of articles comprising a first resilient member arranged to be positioned between said articles, so that said first resilient member and said articles collectively form a first chamber;

said articles have complementary mating surfaces, said first resilient member being located therebetween one of said articles includes a recess formed in the corresponding mating surface, said recess having an inner surface portion, said first resilient member being positioned in said recess and having an exposed surface which is exposed to said inner surface portion, said first resilient member being movable in said recess to cause said exposed surface to be spaced from said inner surface portion to form a second chamber therebetween;

vacuum supply means for supplying a vacuum to said first chamber; and pressure supply means for applying a pressure to said first resilient member to force said first resilient member against both of said articles, while maintaining a seal between said first resilient member and said recess.

2. A clamping device comprising:

at least one resilient member between two adjacent articles, so that said resilient member and said articles collectively form a first chamber;

one of said articles having a recess with a pair of side faces to receive the resilient member therebetween and an inner surface portion; the resilient member being movable in the recess to form a second chamber between the resilient member and said inner surface portion;

said first chamber operable to receive a vacuum supply to establish a reduced pressure in said first chamber, while said second chamber is operable to receive a pressure supply to establish an increased pressure in said second chamber and sufficient to force said resilient member against said adjacent articles.

3. A device as defined in claim 2, further comprising a third article, wherein said resilient member is located between a first article and a second article and another resilient member is located between said second article and a third article, wherein one of said articles is provided with a recess for a corresponding resilient member.

4. A device as defined in claim 2 wherein the adjacent articles have a frictional interface in order to establish a frictional force therebetween, under a vacuum condition.

5. A method for establishing a seal between a pair of articles comprising the steps of:

locating a first resilient member between said articles, so that said first resilient member and said articles collectively form a first chamber;

providing a pair of complementary mating surfaces on said articles and positioning said first resilient member between said mating surfaces;

forming a recess on one of said mating surfaces, wherein said recess has an inner surface portion, positioning said first resilient member in said recess, so that the first resilient member has an exposed surface which is exposed to said inner surface portion and said first resilient member is movable in said recess to cause said exposed surface to be spaced from said inner surface portion to form a second chamber therebetween, applying a vacuum in said first chamber; and applying a positive pressure to said first resilient member to force said first resilient member against said articles, while maintaining a seal between said first resilient member and said recess.

6. A method as defined in claim 2 wherein said resilient members are o-rings.

7. A method as defined in claim 2 wherein one of said articles is stationary and the other of said articles is movable relative thereto.

8. A method of clamping a plurality of adjacent articles, comprising the steps of:

locating at least one resilient member between two of said articles, so that said resilient member and said articles collectively form a first chamber;

providing on one of said articles, a recess having a pair of side faces to receive the resilient member therebetween and an inner surface portion;

arranging the resilient member to be movable in the recess to form a second chamber between the resilient member and said inner surface portion;

applying a vacuum in said first chamber; and applying a positive pressure to said second chamber, sufficient to force said first resilient member against the side faces and the other article.

9. A device for establishing a seal between a pair of articles comprising a first resilient member arranged to be positioned between said articles, so that said first resilient member and said articles collectively form a first chamber;

said articles have complementary mating surfaces, said first resilient member being located therebetween one of said articles includes a recess formed in the corresponding mating surface, said recess having an inner surface portion, said first resilient member being positioned in said recess and having an exposed surface which is exposed to said inner surface portion, said first resilient member being movable in said recess to cause said exposed surface to be spaced from said inner surface portion to form a second chamber therebetween;

a vacuum supply for supplying a vacuum to said first chamber; and a pressure supply for applying a pressure to said first resilient member to force said first resilient member against both of said articles.

10. A method as defined in claim 8 wherein one of said articles is stationary and the other of said articles is movable relative thereto.

11. A method as defined in claim 8 wherein at least three articles are clamped, comprising the steps of:

locating a first resilient member between a first of said articles and a second of said articles;

locating a second resilient member between the second article and a third of said articles;

providing a first recess on one of the first and second articles for said first resilient member; and providing a second recess on one of the second and third articles for said second resilient member.

12. A method as defined in claim 8 further comprising the step of providing a frictional interface between said articles in order to establish a frictional force therebetween.

13. A method as defined in claim 8 wherein said resilient members are o-rings.

* * * * *